US008933885B2

(12) United States Patent
Hamalainen et al.

(10) Patent No.: US 8,933,885 B2
(45) Date of Patent: Jan. 13, 2015

(54) METHOD, APPARATUS, AND COMPUTER PROGRAM PRODUCT FOR REDUCING HAND OR POINTING DEVICE OCCLUSIONS OF A DISPLAY

(71) Applicant: Nokia Corporation, Espoo (FI)

(72) Inventors: Matti Hamalainen, Lempaala (FI);
Radu Ciprian Bilcu, Tampere (FI);
Daniel Gratiot, London (GB)

(73) Assignee: Nokia Corporation, Espoo (FI)

( * ) Notice: Subject to any disclaimer, the term of this patent is extended or adjusted under 35 U.S.C. 154(b) by 122 days.

(21) Appl. No.: 13/626,591

(22) Filed: Sep. 25, 2012

(65) Prior Publication Data

US 2014/0085202 A1    Mar. 27, 2014

(51) Int. Cl.
*G06F 3/033* (2013.01)
*G09G 5/08* (2006.01)
*G01C 22/00* (2006.01)
*G05D 1/00* (2006.01)

(52) U.S. Cl.
USPC .............................. 345/158; 345/173; 701/23

(58) Field of Classification Search
USPC .......................................................... 345/158
See application file for complete search history.

(56) References Cited

U.S. PATENT DOCUMENTS

| | | | |
|---|---|---|---|
| 2006/0244735 A1* | 11/2006 | Wilson | 345/173 |
| 2011/0043455 A1 | 2/2011 | Roth et al. | |
| 2011/0241991 A1* | 10/2011 | Ogura et al. | 345/158 |
| 2011/0248987 A1 | 10/2011 | Mitchell et al. | |
| 2012/0173067 A1* | 7/2012 | Szczerba et al. | 701/23 |
| 2013/0088465 A1* | 4/2013 | Geller et al. | 345/179 |
| 2013/0293468 A1* | 11/2013 | Perez et al. | 345/158 |

FOREIGN PATENT DOCUMENTS

WO    WO-2012/054231    4/2012

OTHER PUBLICATIONS

Vogel et al.; "Shift: A Technique for Operating Pen-Based Interfaces Using Touch;" dated Apr. 28-May 2007; dated accessed Oct. 4, 2012; http://www.dgp.toronto.edu/papers/dvogel_CHI2007.pdf.
Vogel et al.; "Hand Occlusion on a Multi-Touch Tabletop;" dated 2012; date accessed Oct. 4, 2012; http://dl.acm.org/citation.cfm?id=2208390.

* cited by examiner

*Primary Examiner* — Charles V Hicks
(74) *Attorney, Agent, or Firm* — Alston & Bird LLP (57) ABSTRACT

A method is provided for reducing hand or pointing device occlusions of a display, particularly a touch screen or hover display. Detection of the position of a pointing object and eyes relative to a device display may be used to calculate an offset correction. Shifting a user interface component based on the offset correction may reduce pointing object occlusions of the display. A corresponding apparatus and computer program product are also provided.

20 Claims, 5 Drawing Sheets

METHOD, APPARATUS, AND COMPUTER PROGRAM PRODUCT FOR REDUCING HAND OR POINTING DEVICE OCCLUSIONS OF A DISPLAY

TECHNOLOGICAL FIELD

An example embodiment of the present invention relates generally to computing devices, and more particularly, to a method, apparatus and computer program product for reducing hand or pointing device occlusions of a display.

BACKGROUND

The widespread use of mobile devices paired with the increasing demand of highly interactive user interfaces further increases the demand for touch screen displays. The touch screen displays may include hover sensor displays that may not necessarily require a physical touch to the display, but similarly detect a movement of the hand or pointing device in a close proximity to the display. The small size of mobile devices and complexity of user interfaces places an even higher demand on the precision and usability of the user interfaces and how they are presented on a display.

BRIEF SUMMARY

A method, apparatus, and computer program product are therefore provided for reducing hand or pointing device occlusions of a display. The method includes detecting a user's eye location relative to a display, detecting a pointing object position relative to the display, calculating an offset correction based on at least the user's eye location and pointing object position, and causing display of visual feedback based on at least the offset correction.

The method may also include tracking the user's eye movements, movements of a device, and/or pointing object movements, and adjusting the display of the visual feedback based on any of the movements. Calculating the offset correction may include calculating an angle between a line of sight to a perceived selection point and a display surface, and/or calculating a thickness of a pointing object based on at least a distance from an edge point of the pointing object to a point on the display. A line of sight may be defined, for example, by detecting an eye location and/or direction of a user's gaze. As such, detection of a face or head may also be useful in calculating a line of sight. It will be noted that it may not be necessary to determine if the user is looking at the display or looking aside. However, if the geometrical relations of the pointing object and the line of sight are known, the method, apparatus, and computer program product described herein may be utilize these in calculating a shift of a component or any visual feedback to reduce pointing object occlusions.

In some embodiments, detecting the user's eye location may include detecting a location of a right and left eye, and detecting the pointing object position may include detecting the pointing object position using a hover sensor measuring object position and/or object distance from the display surface.

In some embodiments, an apparatus is provided, including at least one processor and at least one memory including computer program code, the at least one memory and the computer program code configured to, with the processor, cause the apparatus to at least detect a user's eye location relative to a display, detect the pointing object position relative to the display, calculate an offset correction based on at least the user's eye location and pointing object position, and cause display of visual feedback based on at least the offset correction.

In some embodiments, the computer program code may be further configured to, with the processor, cause the apparatus to track the user's eye movements, movements of a device, and/or pointing object movements, and adjust the display of the visual feedback based on any of the movements. Calculating the offset correction may include calculating an angle between a line of sight to a perceived selection point and a display surface, and/or calculating a thickness of a pointing object based on at least a distance from an edge point of the pointing object to a point on the display. In some embodiments, detecting the user's eye location may include detecting a location of a right and left eye, and detecting the pointing object position may include detecting the pointing object position using a hover sensor.

According to some embodiments, a computer program product is provided, including at least one non-transitory computer-readable storage medium having computer-executable program code instructions stored therein, the computer-executable program code instructions comprising program code instructions to detect a user's eye location relative to a display, detect the pointing object position relative to the display, calculate an offset correction based on at least the user's eye location and pointing object position, and cause display of visual feedback based on at least the offset correction.

In some embodiments, the computer-executable program code instructions may further include program code instructions to cause the apparatus to track the user's eye movements, movements of a device, and/or pointing object movements, and adjust the display of the visual feedback based on any of the movements. Calculating the offset correction may include calculating an angle between a line of sight to a perceived selection point and a display surface, and/or calculating a thickness of a pointing object based on at least a distance from an edge point of the pointing object to a point on the display. In some embodiments, detecting the user's eye location may include detecting a location of a right and left eye, and detecting the pointing object position may include detecting the pointing object position using a hover sensor.

In a further embodiment, an apparatus is provided that includes means for detecting a user's eye location relative to a display, means for detecting a pointing object position relative to the display, means for calculating an offset correction based on at least the user's eye location and pointing object position and means for causing display of visual feedback based on at least the offset correction.

BRIEF DESCRIPTION OF THE DRAWINGS

Having thus described certain example embodiments of the present invention in general terms, reference will hereinafter be made to the accompanying drawings which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

Figure 1:
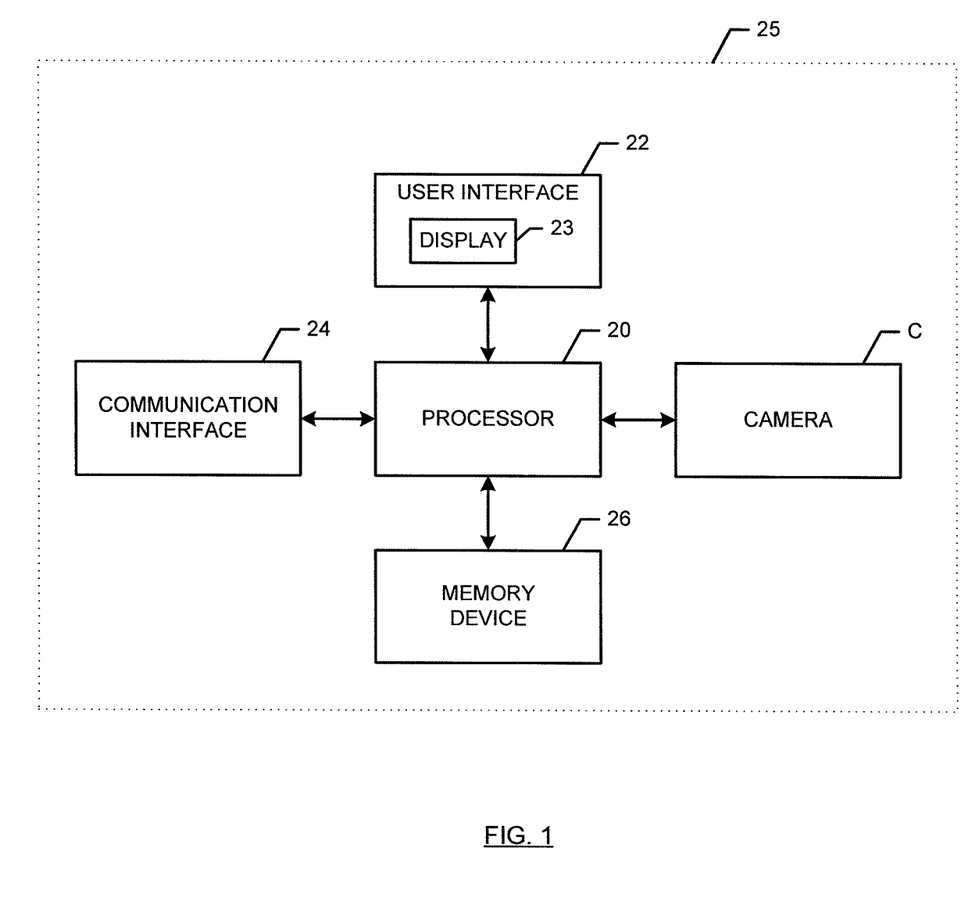
FIG. 1 is a block diagram of an apparatus that may be configured to implement example embodiments.

Referring now to FIG. 1, apparatus 25 may include or otherwise be in communication with a processor 20, and a memory device 26. In some embodiments the apparatus 25 may also optionally include a camera C or other image capturing device, a communication interface 24, and a user interface 22. Apparatus 25 may be embodied by a wide variety of devices including mobile terminals, such as personal digital assistants (PDAs), pagers, mobile televisions, mobile telephones, gaming devices, laptop computers, tablet computers, cameras, camera phones, video recorders, audio/video players, radios, global positioning system (GPS) devices, navigation devices, or any combination of the aforementioned, and other types of voice and text communications systems. The apparatus 25 need not necessarily be embodied by a mobile device and, instead, may be embodied in a fixed device, such as a computer or workstation.

In some embodiments, the processor 20 (and/or co-processors or any other processing circuitry assisting or otherwise associated with the processor 20) may be in communication with the memory device 26 via a bus for passing information among components of the apparatus 25. The memory device 26 may include, for example, one or more volatile and/or non-volatile memories. In other words, for example, the memory device 26 may be an electronic storage device (e.g., a computer readable storage medium) comprising gates configured to store data (e.g., bits) that may be retrievable by a machine (e.g., a computing device like the processor 20). The memory device 26 may be configured to store information, data, content, applications, instructions, or the like for enabling the apparatus to carry out various functions in accordance with an example embodiment of the present invention. For example, the memory device 26 could be configured to buffer input data for processing by the processor 20. Additionally or alternatively, the memory device 26 could be configured to store instructions for execution by the processor 20.

The apparatus 25 may, in some embodiments, be embodied in various devices as described above. However, in some embodiments, the apparatus 25 may be embodied as a chip or chip set. In other words, the apparatus 25 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 25 may therefore, in some cases, be configured to implement an embodiment of the present invention on a single chip or as a single "system on a chip." As such, in some cases, a chip or chipset may constitute means for performing one or more operations for providing the functionalities described herein.

The processor 20 may be embodied in a number of different ways. For example, the processor 20 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 20 may include one or more processing cores configured to perform independently. A multi-core processor may enable multiprocessing within a single physical package. Additionally or alternatively, the processor 20 may include one or more processors configured in tandem via the bus to enable independent execution of instructions, pipelining and/or multithreading.

In an example embodiment, the processor 20 may be configured to execute instructions stored in the memory device 26 or otherwise accessible to the processor 20. Alternatively or additionally, the processor 20 may be configured to execute hard coded functionality. As such, whether configured by hardware or software methods, or by a combination thereof, the processor 20 may represent an entity (e.g., physically embodied in circuitry) capable of performing operations according to an embodiment of the present invention while configured accordingly. Thus, for example, when the processor 20 is embodied as an ASIC, FPGA or the like, the processor 20 may be specifically configured hardware for conducting the operations described herein. Alternatively, as another example, when the processor 20 is embodied as an executor of software instructions, the instructions may specifically configure the processor 20 to perform the algorithms and/or operations described herein when the instructions are executed. However, in some cases, the processor 20 may be a processor of a specific device (e.g., a mobile terminal or network entity) configured to employ an embodiment of the present invention by further configuration of the processor 20 by instructions for performing the algorithms and/or operations described herein. The processor 20 may include, among other things, a clock, an arithmetic logic unit (ALU) and logic gates configured to support operation of the processor 20.

Meanwhile, the communication interface 24 may be any means such as a device or circuitry embodied in either hardware or a combination of hardware and software that is configured to receive and/or transmit data from/to a network and/or any other device or module in communication with the apparatus 25. In this regard, the communication interface 24 may include, for example, an antenna (or multiple antennas) and supporting hardware and/or software for enabling communications with a wireless communication network. Additionally or alternatively, the communication interface 24 may include the circuitry for interacting with the antenna(s) to cause transmission of signals via the antenna(s) or to handle receipt of signals received via the antenna(s). In some environments, the communication interface 24 may alternatively or also support wired communication. As such, for example, the communication interface 24 may include a communication modem and/or other hardware/software for supporting communication via cable, digital subscriber line (DSL), universal serial bus (USB) or other mechanisms.

In some embodiments, such as instances in which the apparatus 25 is embodied by a user device, the apparatus 25 may include a user interface 22 that may, in turn, be in communication with the processor 20 to receive an indication of a user input and/or to cause provision of an audible, visual, mechanical or other output to the user. As such, the user interface 22 may include, for example, a keyboard, a mouse, a joystick, a display, such as display 23, a touch screen(s), touch areas, soft keys, a microphone, a speaker, or other input/output mechanisms. Alternatively or additionally, the processor 20 may comprise user interface circuitry configured to control at least some functions of one or more user interface elements such as, for example, a speaker, ringer, microphone, display, and/or the like. The processor 20 and/or user interface circuitry comprising the processor 20 may be configured to control one or more functions of one or more user interface elements through computer program instructions (e.g., software and/or firmware) stored on a memory accessible to the processor 20 (e.g., memory device 26, and/or the like).

As described herein, a method, apparatus and computer program product are provided to reduce pointing object occlusions on touch screen displays. Similarly, the method, apparatus and computer program product described herein may be used to reduce occlusions on displays which detect a hovering motion of a hand or pointing device and signal to an interface by detecting close proximity gestures or inputs instead of physical touch to a display. As such, and to simplify the description of the example embodiments, the term display, and the example display 23 may be used herein to include the displays of such hover sensor devices or touch screen devices. Similarly, the terms pointing object may refer to any of a pointing device, (such as a stylus or pen) hand, or finger, any of which may be used interchangeably to describe an object intended to provide input to the device, or any object that may otherwise come in close proximity to the device thereby creating the possibility of occluding a portion(s) of the display from sight.

In some embodiments, such as instances in which the apparatus 25 is embodied by a user device, the apparatus 25 may include a camera C or other image capturing device, which is configured to capture images, including video images. Camera C may be particularly useful for capturing placement and/or movement of a hand in front of apparatus 25, or the position and/or focus of eyes on display 23. Additionally or alternatively, apparatus 25 may include any number and type of sensors to detect a position of a hand and/or eyes with respect to the apparatus. As such, to simplify the description of the example embodiments presented herein, the camera C may be used to refer to any means for detecting positioning or movement of a hand and/or eyes relative to display 23 and/or apparatus 25. The example embodiments described herein may refer to a single camera, however, it will be appreciated that some embodiments may not be limited by the number of cameras, or type of a camera, e.g. stereoscopic camera, infra-red camera, etc.

Figure 2:
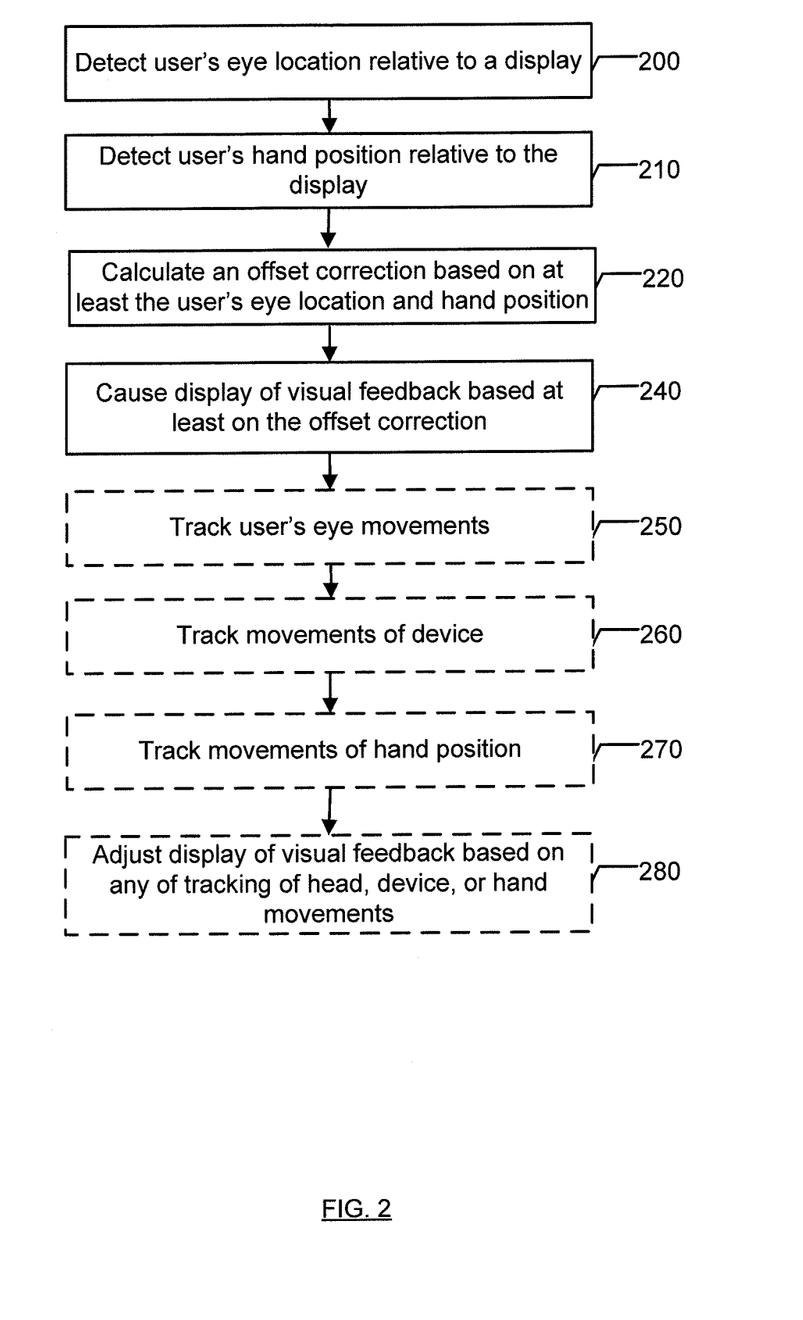
FIG. 2 is a flowchart illustrating operations to reduce hand or pointing device occlusions on a touch screen display in accordance with an example embodiment.

Referring now to FIG. 2, the operations for reducing pointing object occlusions of a display are outlined in accordance with an example embodiment. The operations of FIG. 2 will be described with reference to FIGS. 3 and 4, and may be performed by an apparatus 25. The apparatus 25 may include means, such as the camera C, processor 20, communication interface 24, or the like, for detecting a user's eye location relative to display 23, as shown in operation 200. In some embodiments, the camera C may be centered and placed above a display, while in other embodiments, it may be offset from the display in other manners, such as by being placed to the far right of the display. The location of the camera relative to the display may impact calculations described herein and thus may be taken into account in determining the portion of the display that is overlaid by the user's hand and/or finger. More specifically, in some embodiments, apparatus 25 may determine a distance measure of CD between camera C and the user's eyes, where the eyes are represented by indicator D in FIG. 3. As such, the value of CD may be the distance between camera C and the user's eyes. In some embodiments a distance may be computed by use of more than one camera C or by any other means. Alternatively the value of CD can be set to a fixed value based on an assumption the user looks to the display from the same approximate viewing distance.

In some embodiments in which camera C may detect a user's vision at a stereoscopic level, meaning the location of two eyes may be detected, the corresponding parallax data may be considered as a part of the eye location. With stereo display, the visual experience and depth is sensed by both a right and left eye. If objects are rendered under the hand, the visual experience will be disturbed not only from a two-dimensional perspective, but also from a three-dimensional perspective. In other words, a user's depth perception may be considered in order to reduce occlusions. Therefore in some embodiments, CD may actually be calculated by considering the location of both eyes, for example, $CD=(CL+CR)/2$, where CL is the distance from C to the left eye and CR is the distance from the right eye.

Similarly, at operation 210, apparatus 25 may include means for detecting a user's hand and/or finger position 300 relative to the display, such as by use of camera C, processor 20, communication interface 24, or the like to determine the portion of the display overlaid by the user's hand and/or finger. An edge point E of the finger, that is, the endmost portion of the finger, may similarly be detected.

At operation 220, apparatus 25 may also include means for calculating, such as with processor 20, an offset correction based on at least the user's eye location and hand position. The offset correction may be determined by the calculations described below, and may indicate a distance, in pixels, for example, and a direction to move a user interface component as to prevent and/or reduce hand occlusions. In other words, a user interface component may be moved to a position on a display based on the offset correction, from a position in which the user's hand otherwise may have obstructed the view of the component.

Figure 3:
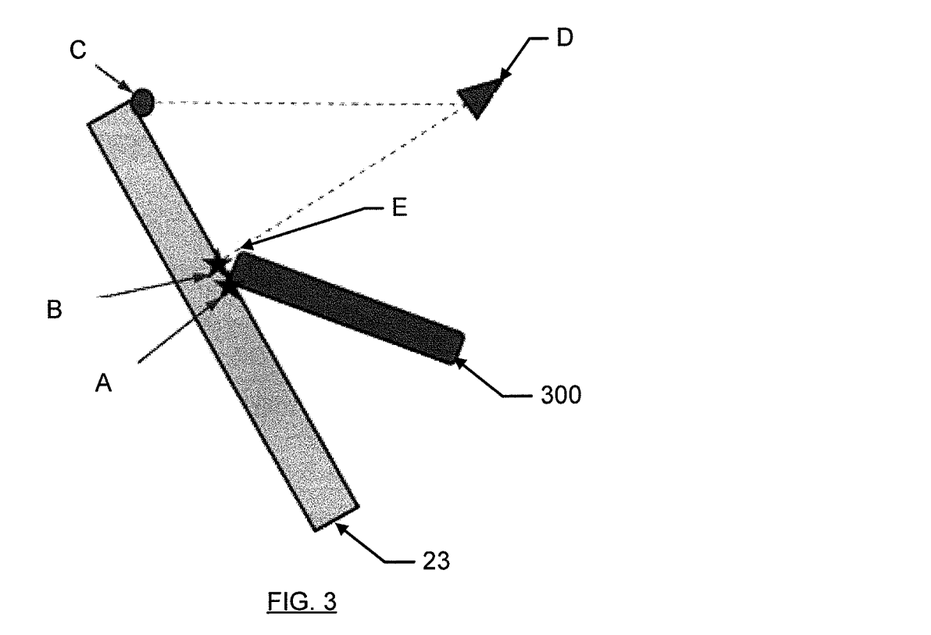
FIGS. 3 and 4 illustrate configurations of a device, hand, and eyes in accordance with example embodiments.
Figure 4:
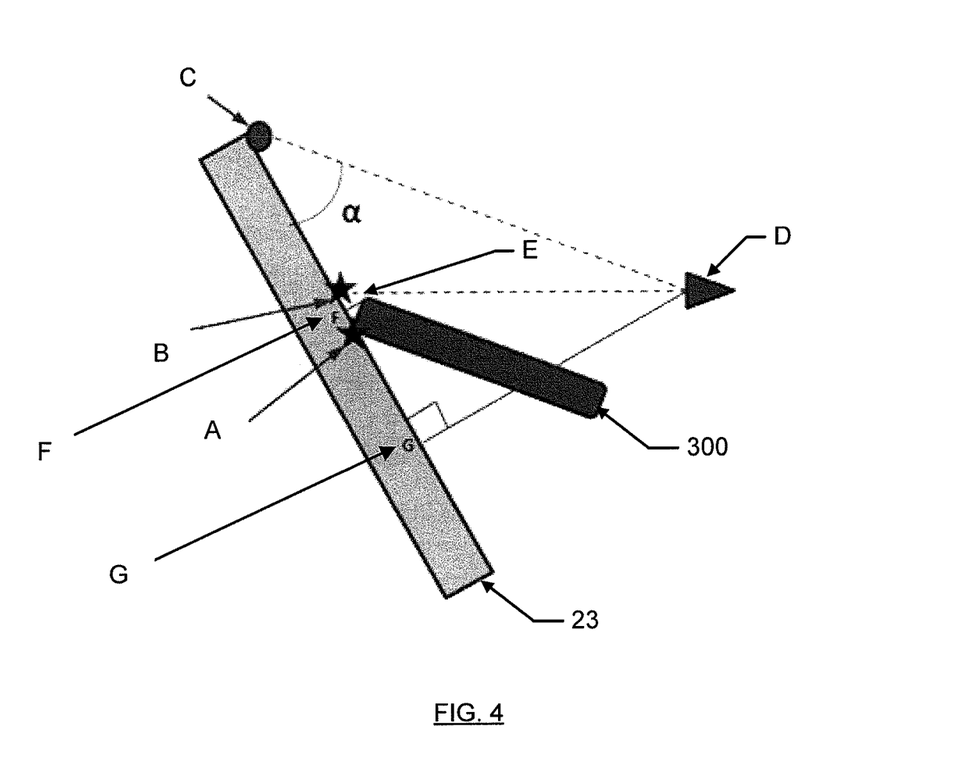

An offset correction may be determined in various manners, but in one embodiment illustrated with reference to FIGS. 3 and 4, the determination of the offset correction begins by determining point A which is an actual selection point where a finger or hand 300 touches display 23 and point B which is a point not occluded or minimally occluded by the finger 300. As such, point B may be referred to as a perceived selection point, and point A may be considered a location that a component is originally intended to display. In this regard, point B may be a first point on a display a user can see just above and beyond, for example, edge point E of the finger 300. As a result of the manner in which the user's finger or hand overlies the display, point A and at least some pixels proximate point A are occluded by the user's finger or hand and cannot be seen by the user. With reference to FIGS. 3 and 4, the distance between the point A and B represents an offset correction AB, e.g., the smallest offset correction, by which a user interface component, such as a pop-up or other visual feedback may be shifted in order to not be occluded by the finger 300. To reduce hand occlusions, apparatus 25 may include means, such as processor 20 or the like, for calculating offset correction AB.

By determining distances of other segments and line angles of FIGS. 3 and 4, and by utilizing known mathematical formulas, apparatus 25 of this example embodiment may calculate, with processor 20, the offset correction AB needed to reduce hand occlusions on display 23, such as the minimum offset correction required to eliminate hand occlusions.

Moreover, to calculate the offset correction AB, apparatus 25 of this example embodiment, such as with processor 20, or the like, may utilize the thickness of the finger by calculating the distance EF from edge point E to point F. In this regard, F is a point on display 23 between A and B and aligned with edge point E, such that EF forms a 90 degree angle with the surface of the display 23. In other words, F may be a perpendicular projection of E onto display 23. The distance EF may be calculated by utilizing the known hand position, and detecting and/or inferring the position of point E. In some embodiments, apparatus 25 may identifying a pointing object as a human hand, and estimate and/or calculate the thickness of a finger based on data relating to human anatomy. By way of example, the thickness of the finger may be ~1 cm and the angle FAE may be 45 degrees, such that the apparatus 25, such as with processor 20, may calculate the length of the segment AF=EF=1/√2 cm. Additionally or alternatively, once a measurement such as EF is captured, apparatus 25, with processor 20, may access it, or any other measurement related to the size of a finger or pointing object for use in the calculation, without having to repeatedly calculate the measurement. Similarly, a categorical or relative sizing of a finger, with associated measurements may be used. For example, apparatus 25, with camera C, may estimate a finger to be small, medium, or large, and use a corresponding measurement for each.

From the similar triangles BFE and BGD (where GD is perpendicular to the display surface, it may be determined that GD/EF=BG/BF. Further, (GD−EF)EF/=(BG−BF)/BF and (GD−EF)/EF=FG/BF.

Taking into account that FG=AF+AG=AF+CG−CA and CG=CD*cos($\alpha$) and EF=AE~1/√2, the apparatus 25, such as the processor may determine the distance BF as follows:

$$BF = EF\frac{EF + CD*\cos(\alpha) - AC}{CD*\sin(\alpha) - EF}.$$

Figure 5:
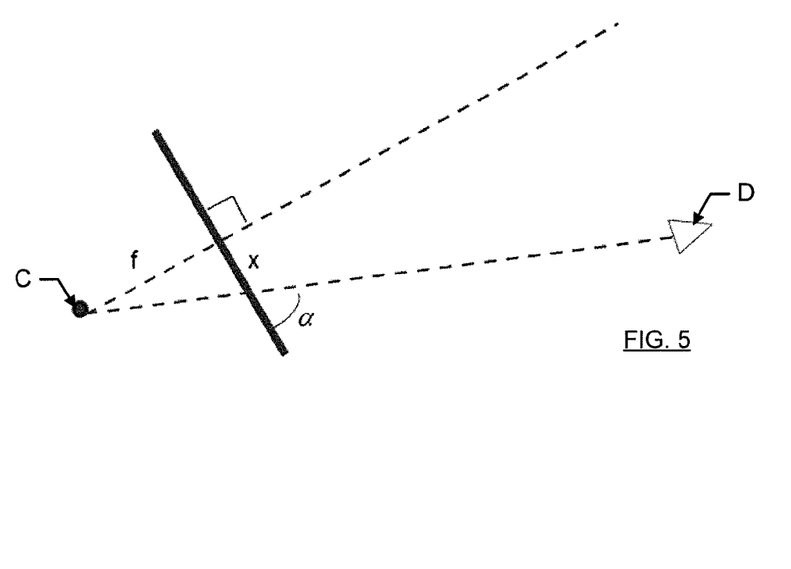
FIG. 5 illustrates another view of measurements with respect to FIGS. 3 and 4.

In this example embodiment, apparatus 25, with processor 20, may calculate value AC as the coordinates of the point A are known and the position of the camera C relative to display 23 is known. Apparatus 25, such as with processor 20, may calculate an angle measurement $\alpha$ between the line CD extending from the user's eye to the camera C and the surface of the display 23, or line CB, with reference to FIG. 5. Apparatus 25 may calculate an angle between a line of sight to the camera C and a display 23. The angle $\alpha$ may be computed as $\alpha$=a tan(f/x), where f is the camera focal length and x is the vertical distance (number of pixel lines) between the center of an image formed in a sensor of a camera C and the position where the eye of the user is seen in the same image as illustrated in FIG. 5. Having now calculated $\alpha$, apparatus 25, e.g., processor 20, may calculate BF using the foregoing equation, and subsequently the offset correction AB as AB=AF+BF.

Additionally or alternatively, along with the distance measurement of AB, the offset correction may include a direction or orientation, such as an angle from A to B, relative to display 23. For instance if the user looks to the display from a side relative to his/her finger, the displacement AB may not be only vertical (e.g., situated on top of the finger) but it may be displaced horizontally such that the finger will not occlude the displayed item. Furthermore, a component may be shifted, for example, to point B, to the left, right above, or below from point A. For example, if a user views a display from the left (with a gaze to the right), apparatus 25 may cause the component to be shifted to the right of the originally intended location, point A.

Returning to FIG. 2, having now described the calculation of the offset correction at operation 220, operation 240 provides that apparatus 25 includes means, such as processor 20, user interface 22, communication interface 24, or the like, for causing display of visual feedback based at least on the offset correction. The offset correction AB may be calculated in centimeters and a value in pixels may be computed, by processor 20, for example, based upon the parameter pixels per centimeter (Pcm) of display 23. As such, the offset correction AB in pixels may be calculated, by apparatus 25, such as by processor 20, as: $AB_{pixel}$=Pcm*AB. As such, apparatus 25, such as the processor 20, user interface 22, or communication interface 24 may cause a shift of at least one component that otherwise may have been displayed at a point A, to point B, by $AB_{pixel}$, thus preventing or reducing hand or pointing object occlusions of the display. In addition to or instead of causing a shift, apparatus 25 may cause the component or any visual feedback to adjust to fit to the display 23. As such, apparatus 25, such as by processor 20, may cause a component or any visual feedback to be enlarged, decreased in size, compressed, and/or the like.

Figure 7A:
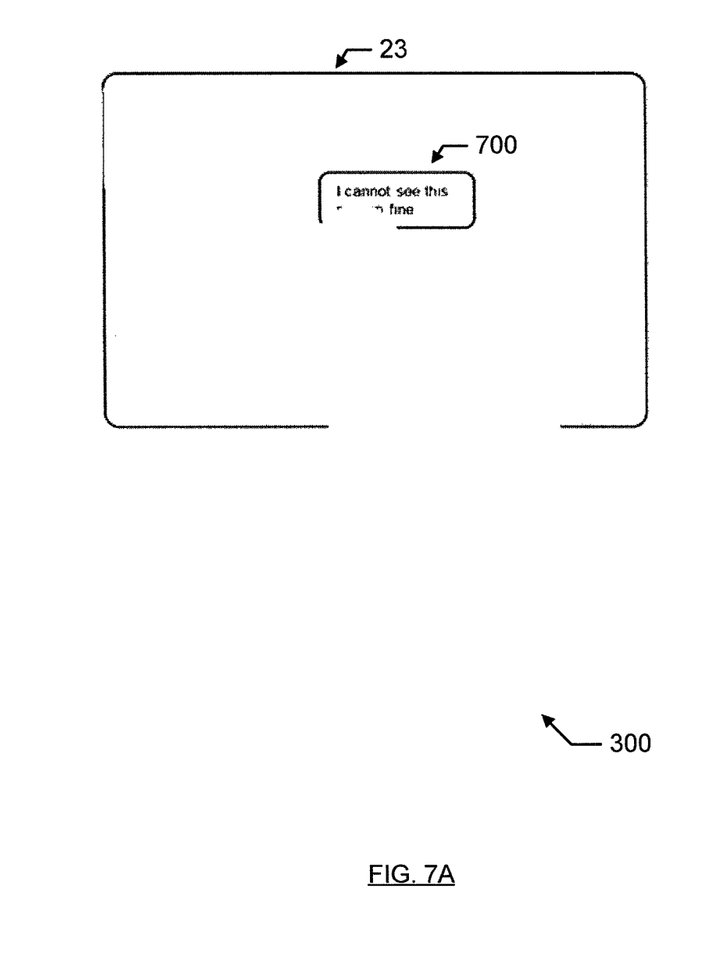
FIG. 7A illustrates a user's perspective of a display for which occlusions have not been reduced.
Figure 7B:
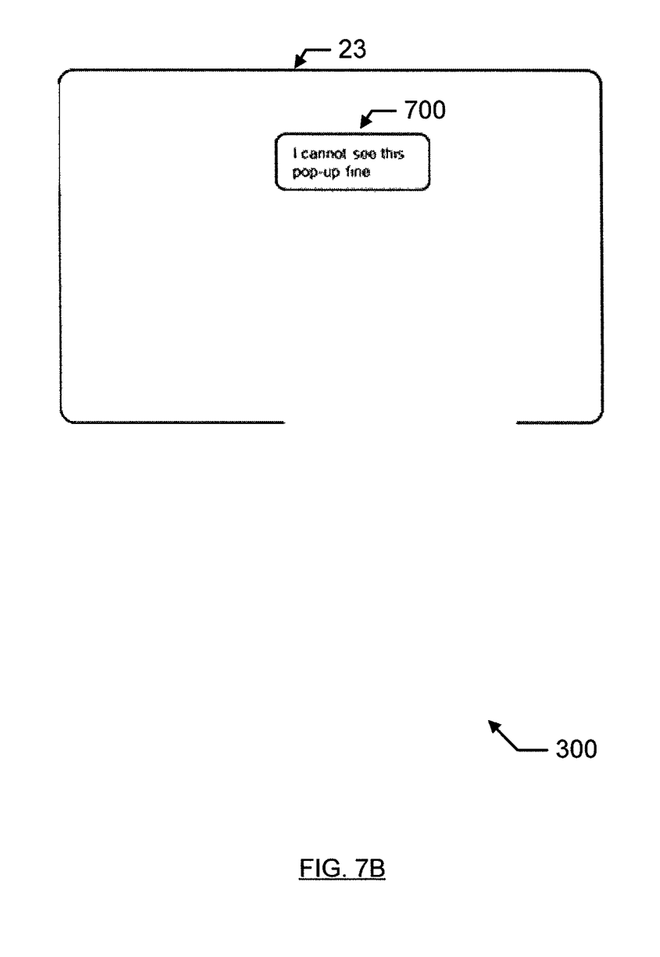
FIG. 7B illustrates a user's perspective of a display for which occlusions have been reduced in accordance with one embodiment of the present invention.

FIG. 7A illustrates an example display 23 of apparatus 25 from a user's perspective, on which hand occlusions have not been reduced. FIG. 7B illustrates an example display 23 of apparatus 25 on which hand occlusions have been reduced, for example, by the operations described herein. Note that pop-up 700 is partially obstructed by hand 300 in FIG. 7A, but that the hand occlusion is reduced in 7B, revealing a greater area of pop-up 700 to the user.

Continuing to operation 250, as a user continues to use a device, the apparatus 25 may include means, such as camera C, processor 20 and/or other vision detection sensors, for tracking the movement of the user's eye(s). Similarly, at operation 260, apparatus 25 may include means, such as processor 20, and/or sensor such as a gyroscope, for tracking movement of a device. At operation 270, apparatus 25 may include means, such as processor 20, camera C, or the like, for tracking movement of the user's hands position. Any of the three factors of eye position, hand location, and device movement may be detected and/or measured relative to another, and integrated into the calculations performed with respect to operations 200-220 described above, and therefore may be used as indication to apparatus 25, such as by processor 20, user interface 22, or communication interface 24, to subsequently and/or continually adjust the display of visual feedback based on the movement of the eyes, hands, or device as described by operation 280.

In regard to FIG. 2, and particularly operation 280, additional sensors may be included in apparatus 25 for more efficient calculation of the offset correction, or saving of processing power in maintaining a state of the display 23. For example, a gyroscope may track device movement at a greater frequency, e.g., 100 Hz, and face tracking may run at a lesser frequency, e.g., 10 Hz, meaning that even fast movements of the device may be tracked by apparatus 25, such as by processor 20, without high frame rate camera processing. This type of setup utilizes the fact the movement of the device orientation may be much faster than movement of a user's position. Considering the varying degrees of detection of hand, eye, and device movement, power consumption of camera C may be significantly reduced during the design of the hardware platform and camera modules. In this regard, several chipsets like OMAP4 and OMAP5 (Open Multimedia Applications Platform) have hardware accelerated face tracking which provides power efficient face tracking solutions.

The operations of FIG. 2 may be implemented by apparatus 25 to prevent or reduce hand occlusions on a touch screen display. Similar principles can be applied to a device using a hover sensor, where selections and user inputs are made by a finger or hand in close proximity to, but not necessarily touching display 23, as shown, for example, in FIG. 6.

Figure 6:
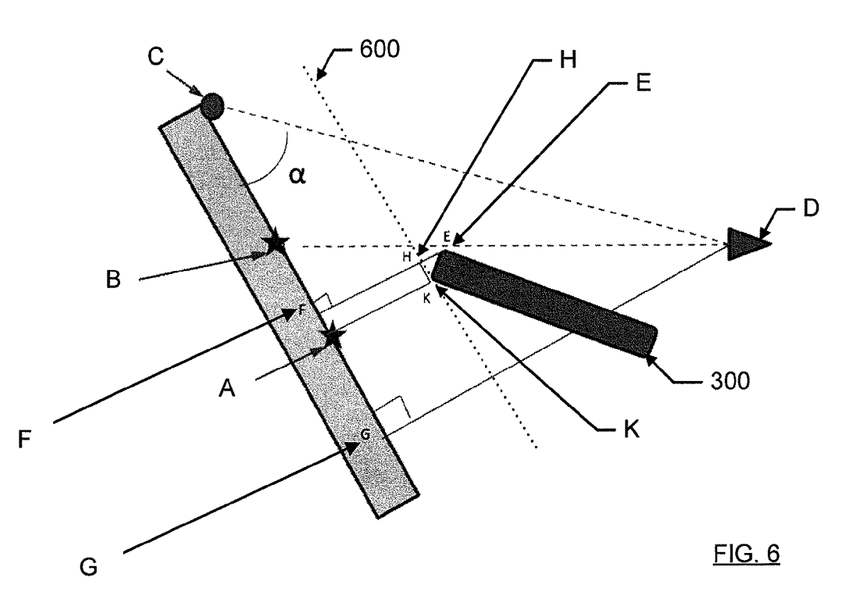
FIG. 6 illustrates a configuration of a device, hover sensor plane, hand, and eyes in accordance with example embodiments.

With reference to FIG. 6, point B may be the perceived selection point and point A may be the actual selection point sensed by the hover sensor. For simplicity, although the hover sensor region may actually detect movement and/or selection in a three-dimensional area, the area in which the hover sensor detects selection will be referred to as the hover sensor plane 600, as seen in FIG. 6, and in this example may lay parallel to display 23. Assuming again that the thickness of the finger 300 is 1 cm, the segment AF may be calculated, by processor 20 of apparatus 25, as: $AF = 1/\sqrt{2}$ cm. From the similar triangles BFE and BGD and using known mathematical formulas, $BG/BF = GD/FE$. Furthermore, $(BG-BF)/BF = (GD-EF)/EF$ and $FG/BF = (GD-EF)/EF$.

Taking into account that: $FG = FA + AG = FA + CG - CA$ and $CG = CD*\cos(\alpha)$ and $AF = 1/\sqrt{2}$ processor 20 of apparatus 25 may calculate $FG = 1/\sqrt{2} + CD*\cos(\alpha) - CA$. Now the length of the segment BF may be determined as follows:

$$BF = EF\frac{FG}{GD-EF} = EF\frac{\frac{1}{\sqrt{2}} + CD\cos(\alpha) - CA}{CD\sin(\alpha) - EF}$$

$EF = FH + HE$, $HE = HK \sim 1/\sqrt{2}$, and $FH = AK$ is the distance from the hover sensor plane 600 to the user's finger 300 as measured by the hover sensor and processor 20 of apparatus 25. The foregoing formula can now be transformed as follows:

$$BF = EF\frac{FG}{GD-EF} = \left(AK + \frac{1}{\sqrt{2}}\right)\frac{\frac{1}{\sqrt{2}} + CD\cos(\alpha) - CA}{CD\sin(\alpha) - \left(AK + \frac{1}{\sqrt{2}}\right)}$$

and the offset correct AB may be calculated, by processor 20, for example, by:

$$AB = $$
$$BF + FA = EF\frac{FG}{GD-EF} = \left(AK + \frac{1}{\sqrt{2}}\right)\frac{\frac{1}{\sqrt{2}} + CD\cos(\alpha) - CA}{CD\sin(\alpha) - \left(AK + \frac{1}{\sqrt{2}}\right)} + \frac{1}{\sqrt{2}}.$$

As such, a method, apparatus and computer program product may therefore be utilized in conjunction with a hover sensor with one embodiment shown, for example, in FIG. 6. Regardless of whether apparatus 25 employs a touch display, hover sensor, or any other type of user interface, the method, apparatus, and computer program described herein may be used to prevent or reduce hand occlusions on the display, and therefore may improve the user experience.

As described above, FIG. 2 illustrates a flowchart of operations performed by an apparatus, method, and computer program product according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 26 of an apparatus 25 employing an embodiment of the present invention and executed by a processor 20 of the apparatus 25. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   detecting a user's eye location relative to a display;
   detecting a pointing object position relative to the display;
   calculating, with a processor, an offset correction based on at least the user's eye location, pointing object position, and a detected endmost edge of the pointing object; and
   causing display of visual feedback based on at least the offset correction.

2. A method according to claim 1, further comprising:
   tracking the user's eye movements; and
   adjusting the display of the visual feedback based on the eye movements.

3. A method according to claim 1, further comprising:
   tracking movements of a device; and
   adjusting the display of the visual feedback based on the movements.

4. A method according to claim 1, further comprising:
   tracking movement of the pointing object; and
   adjusting the display of the visual feedback based on the movements.

5. A method according to claim 1, wherein calculating the offset correction comprises:
   calculating an angle between a line of sight to a perceived selection point and a display surface.

6. A method according to claim 1, wherein calculating the offset correction comprises:
   calculating a thickness of the pointing object based on at least a distance from the detected endmost edge of the pointing object to a point on the display.

7. A method according to claim 6, wherein calculating an object thickness comprises:
   identifying the pointing object as a human hand; and
   calculating the thickness based on data describing human anatomy.

8. A method according to claim 1, wherein detecting the user's eye location comprises:
   detecting a location of a right and left eye.

9. A method according to claim 1, wherein detecting the pointing object position comprises:
   detecting the pointing object position using a hover sensor.

10. An apparatus comprising at least one processor and at least one memory including computer program code, the at least one memory and the computer program code configured to, with the processor, cause the apparatus to at least:
    detect a user's eye location relative to a display;
    detect a pointing object position relative to the display;
    calculate an offset correction based on at least the user's eye location, pointing object position, and a detected endmost edge of the pointing object; and
    cause display of visual feedback based on at least the offset correction.

11. An apparatus according to claim 10, wherein the computer program code is further configured to, with the processor, cause the apparatus to:
    track at least one movement of the user's eye location, the pointing object, or a device; and
    adjust the display of the visual feedback based on the at least one movement.

12. An apparatus according to claim 10, wherein calculating the offset correction comprises:
    calculating an angle between a line of sight to a perceived selection point and a display surface.

13. An apparatus according to claim 10, wherein calculating the offset correction comprises:
    calculating a thickness of the pointing object based on at least a distance from the detected endmost edge of the pointing object to a point on the display.

14. An apparatus according to claim 10 wherein detecting the user's eye comprises:
    detecting a location of a right and left eye.

15. An apparatus according to claim 10, wherein detecting the pointing object position comprises:
    detecting the pointing object using a hover sensor.

16. A computer program product comprising at least one non-transitory computer-readable storage medium having computer-executable program code instructions stored therein, the computer-executable program code instructions comprising program code instructions to:
    detect a user's eye location relative to a display;
    detect a pointing object position relative to the display;
    calculate an offset correction based on at least the user's eye location, pointing object position, and a detected endmost edge of the pointing object; and
    cause display of visual feedback based on at least the offset correction.

17. A computer program product according to claim 16, wherein the computer-executable program code instructions further comprise program code instructions to:
    track at least one movement of the user's eye, the pointing object, or a device; and
    adjust the display of the visual feedback based on the at least one movement.

18. A computer program product according to claim 16, wherein calculating the offset correction comprises:
  calculating an angle between a line of sight to a perceived selection point and a display surface.

19. A computer program product according to claim 16, wherein calculating the offset correction comprises:
  calculating a thickness of the pointing object based on at least a distance from the detected endmost edge of the pointing object to a point on the display.

20. A computer program product according to claim 16, wherein detecting the user's eye comprises:
  detecting a location of a right and left eye.

\* \* \* \* \*